(Model.)

A. O. FRICK.
TRACTION WHEEL.

No. 262,758. Patented Aug. 15, 1882.

Witnesses:
Fred. J. Dieterich
Edw. T. V. Byrn

Inventor:
A. O. Frick
By
Attorneys

UNITED STATES PATENT OFFICE.

ABRAHAM O. FRICK, OF WAYNESBOROUGH, PENNSYLVANIA.

TRACTION-WHEEL.

SPECIFICATION forming part of Letters Patent No. 262,758, dated August 15, 1882.

Application filed January 25, 1881. (Model.)

*To all whom it may concern:*

Be it known that I, ABRAHAM O. FRICK, of Waynesborough, in the county of Franklin and State of Pennsylvania, have invented a new and Improved Traction-Wheel; and I do hereby declare that the following is a full, clear, and exact description of the same, reference being had to the accompanying drawings, forming part of this specification, in which—

Figure 1:
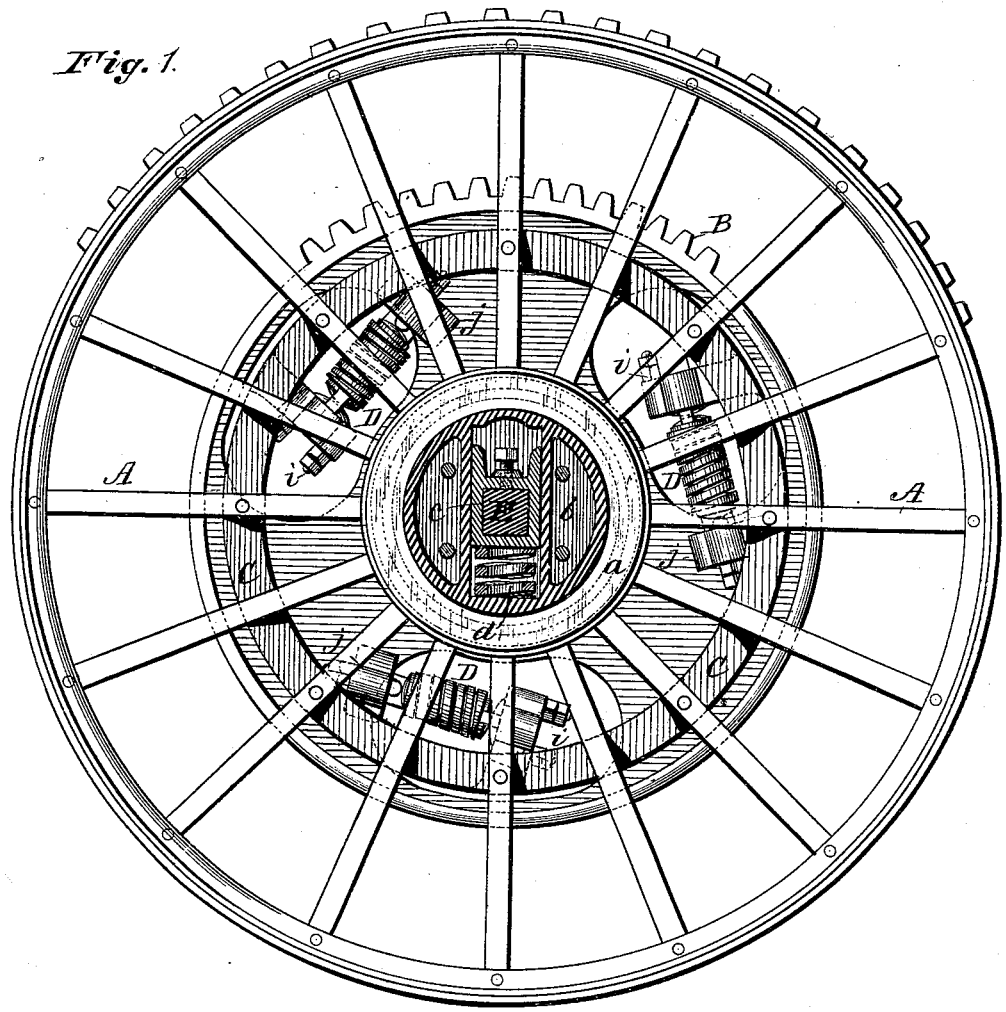
Figure 2:
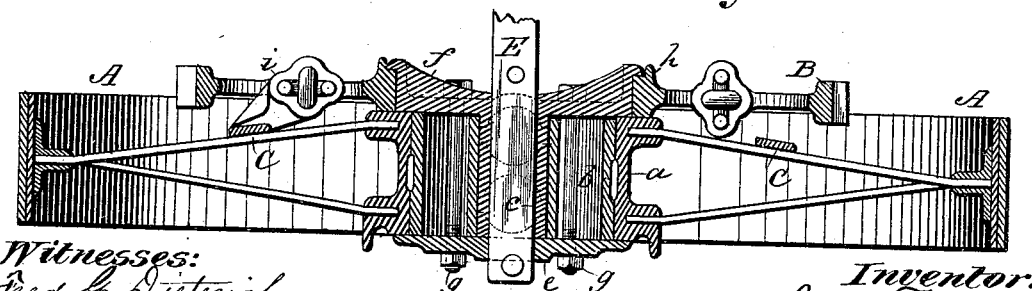

Figure 1 is a side elevation of the wheel with the axle and stationary boxes in section. Fig. 2 is a central section of the wheel.

My invention relates to certain improvements in traction-wheels for road-engines and other analogous purposes. In traction-wheels that are driven by gear-teeth it is very necessary that there should be an elastic connection between the gear-wheel and the running-wheel for overcoming the strain of the vertical jolts and the chattering of the gear-teeth involved by the movement of the load up and down in passing over rough roads, and also for the purpose of overcoming the momentum and rotary strain of the gears if the running-wheel should suddenly strike an obstacle and stop, or when the gears are suddenly started, the latter provision for rotary strain being necessary to prevent stripping the teeth of the gears.

My invention consists in this connection in the combination of a driving gear-wheel and parallel ground or running wheel, each having separate axles or bearings and a spring or springs interposed between the axles or bearings, and an elastic link or links connecting the sides or rim of the driving-gear and ground-wheel, whereby an elastic or spring connection is maintained between the gear and ground-wheel, permitting both vertical and rotary play.

The invention also consists in the peculiar construction and arrangement of the bearings of the axle and gear-wheel in relation to the spring and a movable box, as will be hereinafter more fully described.

In the drawings, A represents a spoked wheel, having a toothed or fluted tire for better engagement with the earth, and a hub, *a*, of large diameter. Within this hub is arranged a stationary box, *b*, having a circular periphery, which, with the inner surface of the hub, forms the lubricated joint of the wheel. This box *b* has in its middle a vertical chamber, with straight guide-walls, within which is contained a smaller box, *c*, having a horizontal hole in which is secured the axle. Within this chamber, and beneath the box *c*, carrying the axle E, are spiral springs *d*, which form an elastic connection between the load on the axle and the wheel. The box *b* is held in the hub *a* of the wheel against slipping out laterally by a head-plate, *e*, on the outer end of the axle, and a corresponding plate, *f*, at the opposite end, which latter is formed in one piece with the inner box, *c*, the two plates *e* and *f* being fastened together by bolts *g*.

B is a gear attached to the side of the running-wheel and bearing teeth which mesh with the teeth of the driving-pinion of the engine. This wheel B has a hub, *h*, that turns on a peripheral bearing of the plate *f*. It will be seen, therefore, that this rotary bearing of the gear-wheel is always concentric with the axle, because the axle is carried in the box *c*, which is a rigid extension from said head or bearing *f*. Hence it is apparent that the springs *d* are interposed between the rotary bearings of the gear-wheel B and the rotary bearing of the running or ground wheel A, so as to allow the latter to move in a parallel plane across the face of the former. This gear-wheel B is, for rotary strain, attached to the wheel A in a peculiar manner. Thus to the side of the spokes of wheel A, I attach strongly by bolts a circular band of metal, C, carrying lugs *i*, while upon the arms or web portion of wheel B are formed other lugs, *j*. These sets of lugs *i* and *j*, I then connect by spiral springs D, which are in the nature of elastic links, that transmit the rotary driving strain of the engine from the gear-wheel B to the running or traction wheel A.

Now, in defining my invention more clearly, I would state that I am aware of the English Patent No. 4,812 of 1877, in which are combined the two sets of springs for vertical jolts and rotary strain. In such case, however, the springs that carry the load are not located between the bearings of a gear-wheel and the bearings of the running-wheel, and hence the axle in that case in overcoming the tension of the springs meets with a resistance equivalent to the constant ascent of an incline, which is overcome by the separate bearings employed by me with the spring interposed between the same.

I am also aware that a vehicle-wheel which runs simply without propelling has had an axle with a subjacent spring contained in a hollow box around which the hub revolves, and in this specific structure I only claim the additional box c, which gives a larger and stronger bearing and a firmer sliding connection between the axle and the main box. This box c may also be removed with head f when worn, and replaced by another with much less expense than would be incurred by an entire new axle.

Having thus described my invention, what I claim as new is—

1. A traction-wheel for a traction-engine, consisting of the combination of a driving gear-wheel and parallel ground-wheel, each having a separate axle or bearing and a spring or springs interposed between the axles or bearings, and an elastic link or links connecting the sides or rims of the driving-gear and ground-wheel, substantially as described, whereby an elastic or spring connection is maintained between the gear and ground wheel, permitting both vertical and rotary play.

2. In a wheel having its axle-spring seated within its hub, the combination, with the hub and a hollow non-rotating box therein, of a removable box, c, carrying the axle and fitting snugly within the main box, and one or more springs located beneath the said box c and between the same and the main box, as shown and described.

3. A traction-wheel composed of a running-wheel and a gear applied to each other and connected by springs, as described, combined with the axle and a spring-seat box carrying the axle, located within the hub of the running-wheel, as shown and described.

4. The combination of wheel A, having hub a, box b, spring-seated box c, the heads e and f, and the wheel B, arranged to revolve upon the peripheral portion of head f and flexibly connected with wheel A, as described.

ABRAHAM O. FRICK.

Witnesses:
   JAS. A. ROBINSON,
   THOS. ROBINSON.